(12) United States Patent
Wang

(10) Patent No.: US 8,847,423 B2
(45) Date of Patent: Sep. 30, 2014

(54) WIND POWER GENERATING APPARATUS AND WIND BLADE STRUCTURE

(75) Inventor: Jingfu Wang, Jinan (CN)

(73) Assignee: Shandong Zhongtai New Energy Group Co., Ltd, Jinan (CN)

( * ) Notice: Subject to any disclaimer, the term of this patent is extended or adjusted under 35 U.S.C. 154(b) by 87 days.

(21) Appl. No.: 13/576,355

(22) PCT Filed: Jan. 20, 2011

(86) PCT No.: PCT/CN2011/070425
§ 371 (c)(1),
(2), (4) Date: Jul. 31, 2012

(87) PCT Pub. No.: WO2011/095075
PCT Pub. Date: Aug. 11, 2011

(65) Prior Publication Data
US 2012/0292916 A1    Nov. 22, 2012

(30) Foreign Application Priority Data
Feb. 5, 2010  (CN) .......................... 2010 1 0106452

(51) Int. Cl.
*F03D 9/00* (2006.01)
*H02P 9/04* (2006.01)
*F03D 3/06* (2006.01)

(52) U.S. Cl.
CPC *F03D 3/067* (2013.01); *Y02E 10/74* (2013.01)
USPC ............... 290/55; 290/43; 290/44; 290/54

(58) Field of Classification Search
USPC .......................... 290/43, 44, 54, 55
See application file for complete search history.

(56) References Cited

U.S. PATENT DOCUMENTS 662,737 A * 11/1900 Puszkar ................ 416/118
887,142 A *  5/1908 Stevenson ............... 416/41
(Continued)

FOREIGN PATENT DOCUMENTS

CN  2334898     8/1999
CN  2334898 Y   8/1999
(Continued)

OTHER PUBLICATIONS

Patent Examination Report for Australian Patent Application No. 2011213447 dated Aug. 28, 2013.
(Continued)

*Primary Examiner* — Pedro J Cuevas
(74) *Attorney, Agent, or Firm* — Foley & Lardner LLP

(57) ABSTRACT

A wind blade structure includes a wind blade frame (3), wind blade shafts (5, 6, 24) provided in the wind blade frame (3), movable blades (4) and blade stoppers (23). The blade stoppers (23) are projecting elements on the wind blade frame (3) or the wind blade shafts (5, 6, 24) for blocking the movable blades (4) from rotating when the movable blades (4) rotate to a position where they overlap with the wind blade frame (3). The areas of two portions of the movable blade (4) on both sides of the wind blade shaft (5, 6, 24) are not equal. A wind power generating apparatus is also disclosed, comprising at least one wind wheel mechanism rotating around its rotary shaft (2). The wind wheel mechanism includes at least one wind blade structure. The wind power generating apparatus and the wind blade structure may endure the impact of a strong wind without being damaged easily.

17 Claims, 5 Drawing Sheets

(56) References Cited

U.S. PATENT DOCUMENTS

| | | | | |
|---|---|---|---|---|
| 1,225,033 | A | | 5/1917 | Jackson ............... 415/141 |
| 1,319,766 | A | * | 10/1919 | Gracey ............... 416/117 |
| 3,442,492 | A | * | 5/1969 | Sullivan ............... 416/85 |
| 3,726,070 | A | * | 4/1973 | Klosterman et al. ............ 56/294 |
| 4,045,148 | A | * | 8/1977 | Morin ............... 416/84 |
| 4,052,134 | A | * | 10/1977 | Rumsey ............... 416/119 |
| 4,115,027 | A | * | 9/1978 | Thomas ............... 415/53.1 |
| 4,128,363 | A | * | 12/1978 | Fujikake et al. ........... 416/236 A |
| 4,142,832 | A | * | 3/1979 | Clifton ............... 416/117 |
| 4,253,800 | A | * | 3/1981 | Segawa et al. ............... 416/203 |
| 4,303,835 | A | * | 12/1981 | Bair ............... 290/55 |
| 4,346,305 | A | * | 8/1982 | White ............... 290/55 |
| 4,365,935 | A | * | 12/1982 | Zukeran ............... 416/119 |
| 4,377,372 | A | * | 3/1983 | Stutzman ............... 416/117 |
| 4,468,169 | A | * | 8/1984 | Williams ............... 416/119 |
| 4,496,283 | A | | 1/1985 | Kodric ............... 416/44 |
| 4,534,703 | A | * | 8/1985 | Flavell ............... 416/119 |
| 4,679,985 | A | * | 7/1987 | Worms ............... 416/119 |
| 4,883,240 | A | * | 11/1989 | Adamson et al. ............... 244/69 |
| 5,066,195 | A | * | 11/1991 | Dobrzynski ............ 416/200 R |
| 5,193,978 | A | * | 3/1993 | Gutierrez ............... 416/24 |
| 5,266,007 | A | * | 11/1993 | Bushnell et al. ............... 416/178 |
| 5,570,997 | A | * | 11/1996 | Pratt ............... 416/117 |
| 5,855,470 | A | * | 1/1999 | Holmes ............... 416/11 |
| 6,491,499 | B1 | * | 12/2002 | Marvin et al. ............... 416/203 |
| 6,599,085 | B2 | * | 7/2003 | Nadeau et al. ............... 415/119 |
| 6,688,842 | B2 | * | 2/2004 | Boatner ............... 415/4.2 |
| 6,752,595 | B2 | * | 6/2004 | Murakami ............... 416/87 |
| 6,857,846 | B2 | | 2/2005 | Miller ............... 415/4.2 |
| 7,204,674 | B2 | * | 4/2007 | Wobben ............... 416/1 |
| 7,258,527 | B2 | * | 8/2007 | Shih ............... 416/119 |
| 7,743,497 | B2 | * | 6/2010 | Gautreau et al. ........ 29/888.021 |
| 7,821,148 | B2 | * | 10/2010 | Piasecki et al. ............... 290/44 |
| 8,051,655 | B2 | * | 11/2011 | Silver et al. ............... 60/516 |
| 8,087,894 | B2 | * | 1/2012 | Brooks ............... 416/117 |
| 8,092,188 | B2 | * | 1/2012 | Rosati et al. ............... 416/229 A |
| 8,133,023 | B2 | * | 3/2012 | Reitz ............... 416/1 |
| 8,282,350 | B2 | * | 10/2012 | Corrado ............... 416/1 |
| 8,393,865 | B2 | * | 3/2013 | Vronsky et al. ............... 416/23 |
| 8,585,364 | B2 | * | 11/2013 | Kosch ............... 416/12 |
| 8,657,560 | B2 | * | 2/2014 | Grenier et al. ............... 416/1 |
| 2003/0044283 | A1 | * | 3/2003 | Nadeau et al. ............... 416/193 R |
| 2006/0075752 | A1 | * | 4/2006 | Silver et al. ............... 60/670 |
| 2007/0014658 | A1 | * | 1/2007 | Mollinger ............... 415/4.2 |
| 2007/0243066 | A1 | * | 10/2007 | Baron ............... 416/132 B |
| 2008/0217924 | A1 | | 9/2008 | Boone ............... 290/53 |
| 2008/0267777 | A1 | | 10/2008 | Lux ............... 416/132 B |
| 2009/0001730 | A1 | * | 1/2009 | Kuo et al. ............... 290/55 |
| 2009/0019846 | A1 | * | 1/2009 | Silver et al. ............... 60/517 |
| 2009/0115194 | A1 | * | 5/2009 | Lin ............... 290/55 |
| 2009/0202346 | A1 | * | 8/2009 | Baron ............... 416/9 |
| 2010/0143138 | A1 | * | 6/2010 | Marvin et al. ............... 416/179 |
| 2012/0049534 | A1 | * | 3/2012 | Kikuchi ............... 290/55 |
| 2012/0051939 | A1 | * | 3/2012 | Marvin et al. ............ 416/244 R |

FOREIGN PATENT DOCUMENTS

| | | | |
|---|---|---|---|
| CN | 1707093 | | 12/2005 |
| CN | 1707093 | A | 12/2005 |
| CN | 201043510 | Y | 2/2008 |
| CN | 201043510 | | 4/2008 |
| CN | 101196162 | | 6/2008 |
| CN | 101230837 | | 7/2008 |
| CN | 101230837 | A | 7/2008 |
| CN | 101196162 | A | 11/2008 |
| CN | 201250751 | Y | 3/2009 |
| CN | 201420647 | Y | 3/2010 |
| CN | 101737270 | A | 6/2010 |
| CN | 20160825 | U | 10/2010 |
| CN | 101230837 | | 4/2011 |
| DE | 3223859 | | 7/1983 |
| DE | 198 15 208 | | 10/1999 |
| FR | 2930301 | | 10/2009 |
| JP | 59-208172 | | 11/1984 |
| JP | 06-159223 | | 6/1994 |
| JP | 2000-291527 | | 10/2000 |
| JP | 2000291527 | A | 10/2000 |
| JP | 2001-323686 | | 11/2001 |
| JP | 2009191504 | A * | 8/2009 ............... E02D 5/80 |
| RU | 2202048 | | 4/2003 |
| RU | 2003127016 | | 3/2005 |
| WO | WO-94/03725 | | 2/1994 |
| WO | WO-2008/001273 | | 1/2008 |
| WO | WO-2009/126533 | | 10/2009 |
| WO | WO-2010/062018 | | 6/2010 |

OTHER PUBLICATIONS

Office Action for Canadian Patent Application No. 2,788,909 dated Oct. 25, 2012.
Office Action for Canadian Patent Application No. 2,788,909 dated Apr. 2, 2013.
Office Action for Canadian Patent Application No. 2,788,909 dated Aug. 14, 2013.
Office Action for Canadian Patent Application No. 2,788,909 dated Nov. 26, 2013.
First Examination Opinion for Chinese Patent Application No. 201010106452X dated Apr. 8, 2011.
Office Action for Japanese Patent Application No. 2012-551484 (with English summary).
Notice of Non-Final Rejection for Korean Patent Application No. 10-2012-7022655 dated Oct. 25, 2013.
Invitation to Respond to Written Opinion for Singapore Patent Application No. 201205590-1 dated Feb. 12, 2013.
International Search Report for PCT/CN2011/070425 dated Apr. 28, 2011 (including English translation).
International Preliminary Report on Patentability for PCT/CN2011/070425 dated Aug. 7, 2012 (including English translation).
Russian Office Action for Application No. 2012137778 dated Jan. 20, 2011 with English Translation.

* cited by examiner

WIND POWER GENERATING APPARATUS AND WIND BLADE STRUCTURE

RELATED APPLICATIONS

The present application is a U.S. National Stage of International Application No. PCT/CN2011/070425, filed Jan. 20, 2011, which claims priority to Chinese Patent Application No. 201010106452.X, filed Feb. 5, 2010. The contents of the foregoing applications are hereby incorporated herein by reference in their entireties.

FIELD OF THE INVENTION

The present invention relates to wind power generating technology, and more particularly, to a wind power generating apparatus and a wind blade structure.

BACKGROUND OF THE INVENTION

With the energy sources becoming increasingly scarce, people have been trying to develop and use new available energy sources for a long time. Wind power is plentiful, produces no pollutants, has large potential, thus has drawn wide attention all over the world, and many countries have invested a lot of money in researching and developing techniques for utilizing the wind power.

At present, apparatuses for generating wind power mainly include two types: one is horizontal axis wind power generating apparatus and the other is vertical axis wind power generating apparatus. The horizontal axis wind power generating apparatus has been widely applied because it can take full advantage of upper-air wind power, have high wind power conversion efficiency and other advantages. But blades of the horizontal axis wind power generating apparatus are relatively long which needs large travelling space, thus have high requirements for the strength of materials and are easily damaged by the impact of wind. Existing vertical axis wind power generating apparatus can effectively use lower-air wind, has no offroute and no tail power system, can accept wind from any direction. But this type of wind power generating apparatus not only needs to endure both upwind and downwind impacts, but also needs to adapt itself to changes in both wind directions and wind forces, which make the wind wheel mechanism of the vertical axis wind power generating apparatus easy to be damaged and have a relatively short service life.

SUMMARY OF THE INVENTION

In order to overcome at least part of the disadvantages of existing wind power generating apparatus in the structure, embodiments of the present invention provide a wind power generating apparatus whose wind wheel mechanism is less vulnerable to relatively large wind force and is more endurable.

On the other hand, embodiments of the present invention also provide a wind blade structure which can be applied in the wind power generating apparatus and can endure the impact of a strong wind without being damaged easily.

The technical solution adopted by the present invention to solve the technical problem is as follows.

A wind power generating apparatus provided in the present invention includes: at least one wind wheel mechanism which rotates around a rotary shaft of the wind power generating apparatus under action of wind force; wherein the wind wheel mechanism comprises at least one wind blade structure; the wind blade structure comprises: a wind blade frame, wind blade shafts, movable blades and at least one blade stopper;

the wind blade shafts are disposed on the wind blade frame;

the blade stopper is disposed on the wind blade frame or the wind blade shafts and is configured to block the movable blades from rotating when the movable blades rotate around the wing blade shafts to a position where they overlap with the wind blade frame;

areas of two portions of the movable blade on both sides of the wind blade shaft are not equal.

A wind blade provided in the present invention includes: a wind blade frame, wind blade shafts, movable blades, a blade opening control mechanism and at least one blade stopper;

the wind blade shafts are disposed on the wind blade frame;

the blade stopper is disposed on the wind blade frame or the wind blade shafts and is configured to block the movable blades from rotating when the movable blades rotate around the wing blade shafts to a position where they overlap with the wind blade frame;

areas of two portions of the movable blade on both sides of the wind blade shaft are not equal.

It can be seen from the above technical solution, the wind wheel mechanism of the wind power generating apparatus provided in one embodiment of the present invention can endure the impact of a strong wind without being damaged easily.

The wind blade structure provided in the present invention can endure the impact of a strong wind without being damaged easily.

DETAILED DESCRIPTION OF EXAMPLES

To make the objectives, technical solution and advantages of embodiments of the present invention more clear, the embodiments of the present invention are hereinafter described in detail with reference to the accompanying drawings and embodiments.

In view of the problem of the existing wind power generating apparatus that the wind wheel mechanism can be easily damaged, the present invention improves the wind wheel mechanism to make a wind wheel mechanism include a wind blade structure which has larger wind resistance when moving downwind and has smaller wind resistance when moving upwind, so that the wind wheel mechanism can make full use of wind power and improve the power generation efficiency while being less vulnerable to large wind.

A wind blade structure according to an embodiment of the present invention may include: a wind blade frame, a wind blade shaft, a movable blade and at least one blade stopper;

the wind blade shaft is provided in the wind blade frame;

the blade stopper is provided on the wind blade frame or the wind blade shaft for blocking the movable blade from continuing rotating when the movable blade rotates around the wind blade shaft to a position where the movable blade overlaps with the wind blade frame. The areas of two portions of the movable blade on both sides of the wind blade shaft are not equal.

The blade stopper may be implemented in various manners, e.g., it may be one or more projecting elements on the wind blade frame extending towards the inside of the wind blade frame; or when the shape of the wind blade frame is not exactly the same with the contour shape of the movable blade (e.g. the wind blade frame may have a concave corner), the function of the blade stopper can be implemented by a portion of the wind blade frame, and the portion is also called a blade stopper in this application. The present invention does not limit specific implementation forms of the blade stopper, and has no requirements on the shape, size, material and location as long as the function of the blade stopper can be realized.

Figure 1:
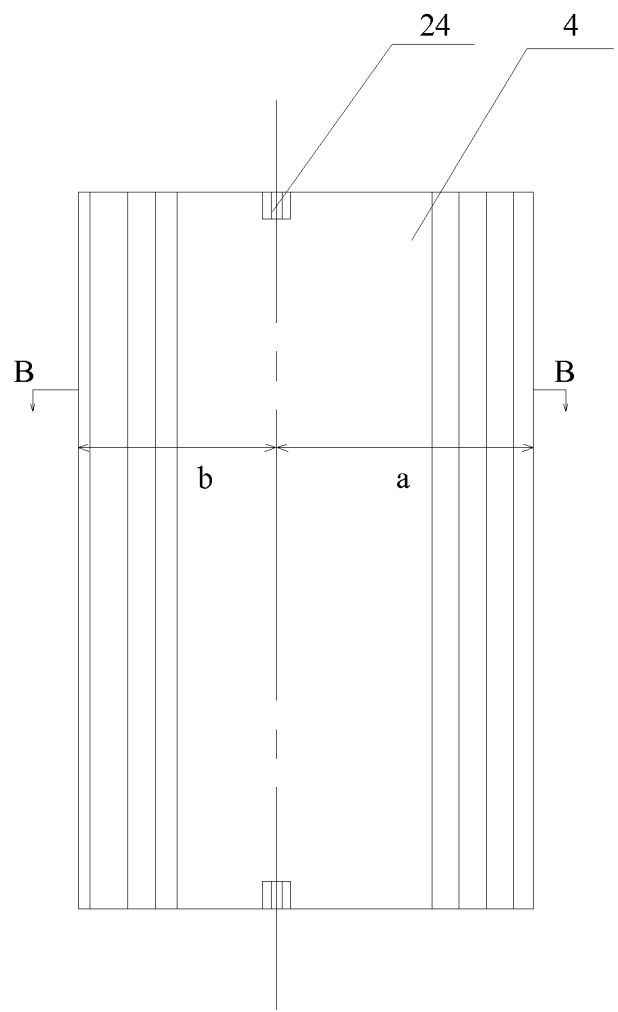
FIG. 1 is a schematic illustrating a movable blade according to an embodiment of the present invention.
Figure 2:
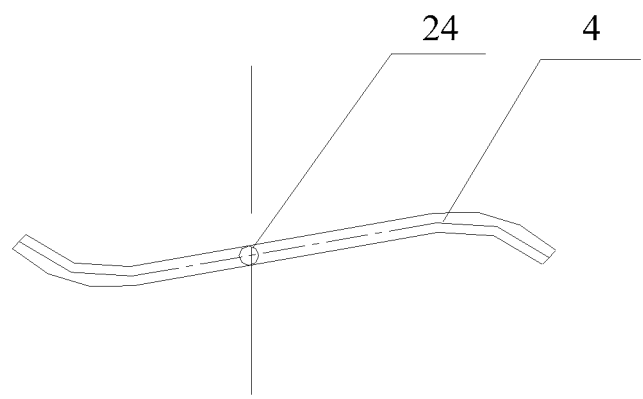
FIG. 2 is a schematic illustrating a cross-sectional view of FIG. 1 taken through line B-B according to an embodiment of the present invention.

FIG. 1 is a schematic illustrating a structure of a wind blade according to an embodiment of the present invention. FIG. 2 is a schematic illustrating a cross-sectional view of FIG. 1 taken through line B-B according to an embodiment of the present invention. As shown in FIGS. 1-2, the areas of two portions of the movable blade 4 on the two sides of the wind blade shaft 24 are not equal to make the two portions produce different wind resistance when a wind force is applied to the movable blade, and the difference in the resistance forces the movable blade to rotate around the blade shaft with the blade shaft serving as an axle. As is shown in FIG. 1, the widths of the portions of the movable blade on the two sides of the wind blade shaft are different, i.e., a>b. Besides the rectangular wind blade shown in the figure, the movable blade can also have other shapes. The area of the movable blade is generally smaller than or equal to the area of the wind blade frame.

The function of the blade stopper is to block the movable blade when the wind blade frame is moving downwind to prevent the movable blade from continuing to rotate under the action of the wind which leads to a decrease in the area of thrust surface, and make the movable blade stay in a position which is in a line with the wind blade frame so that the movable blade receives the driving force of the wind with a largest area, thereby achieving the purpose of making full use of wind energy.

Figure 3:
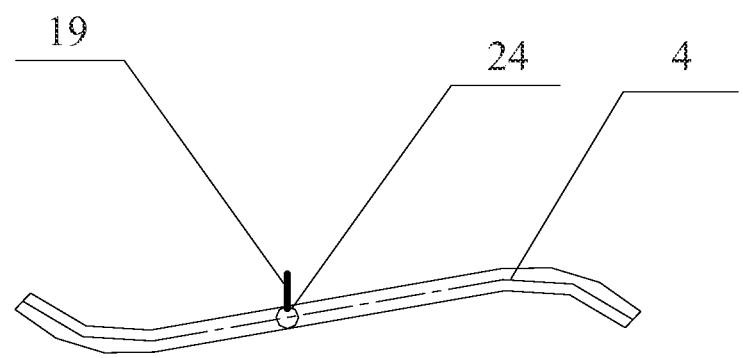
FIG. 3 is a schematic illustrating a cross-sectional view of FIG. 1 taken through line B-B according to another embodiment of the present invention.
Figure 4:
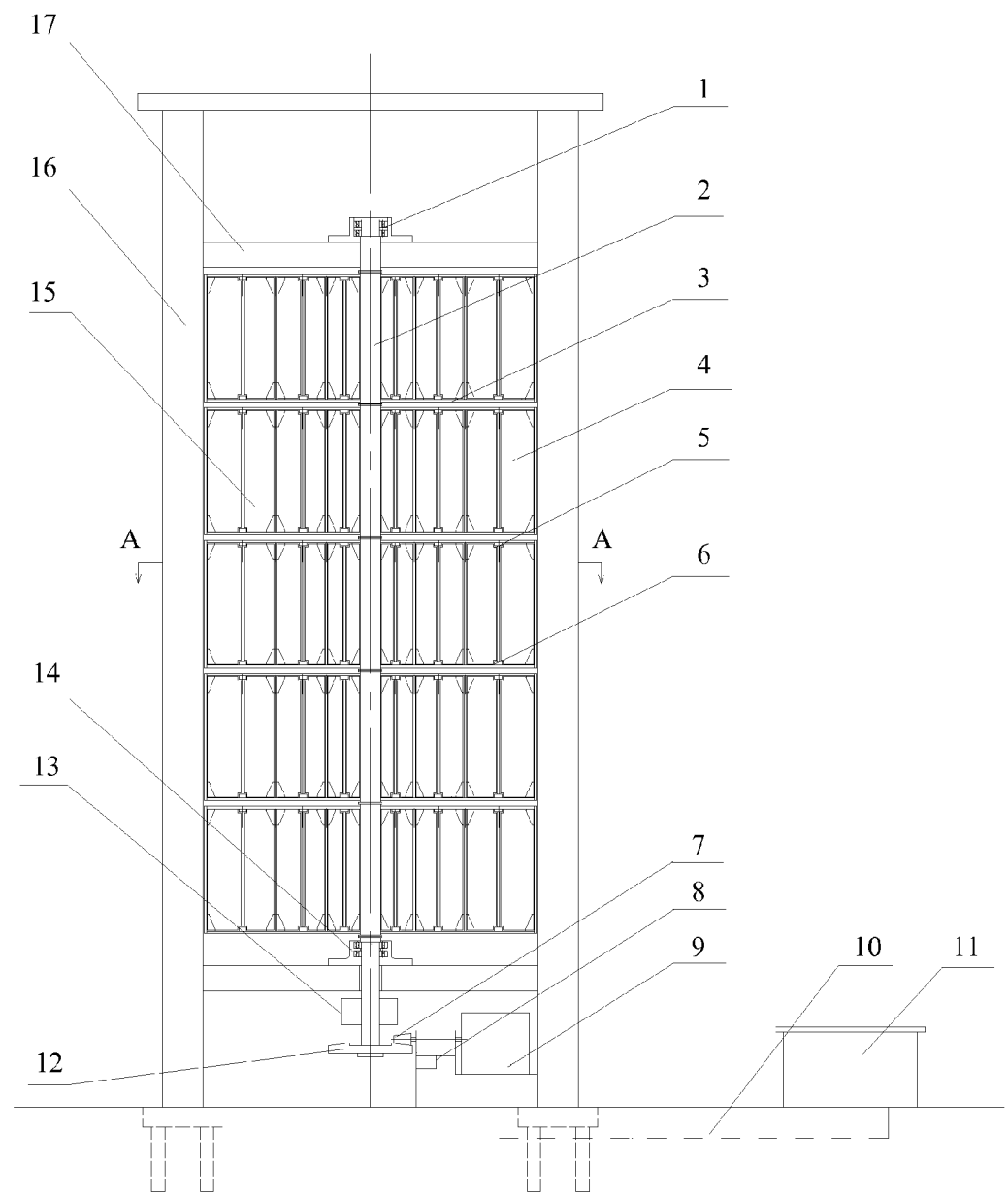
FIG. 4 is a schematic view of a wind power generating apparatus according to an embodiment of the present invention.
Figure 5:
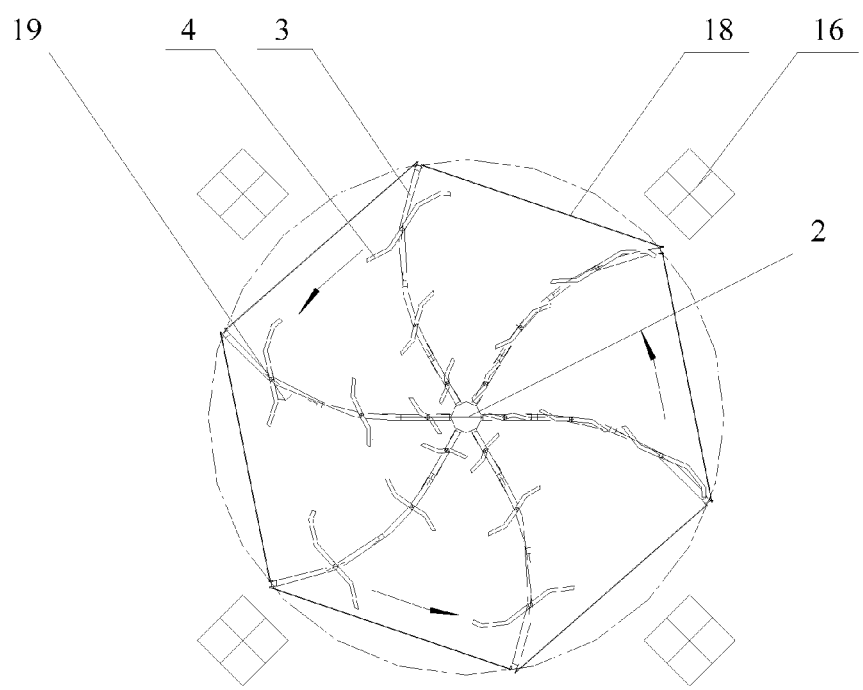
FIG. 5 is a schematic illustrating a sectional view of FIG. 4 taken through line A-A.
Figure 6:
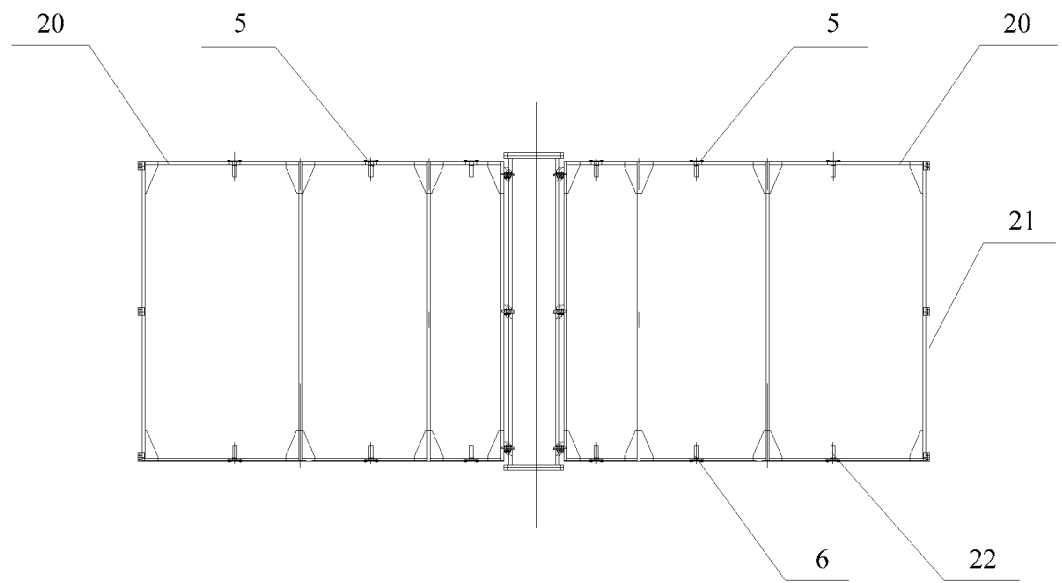
FIG. 6 is a schematic illustrating a structure of an arc-shaped frame according to an embodiment of the present invention.
Figure 7:
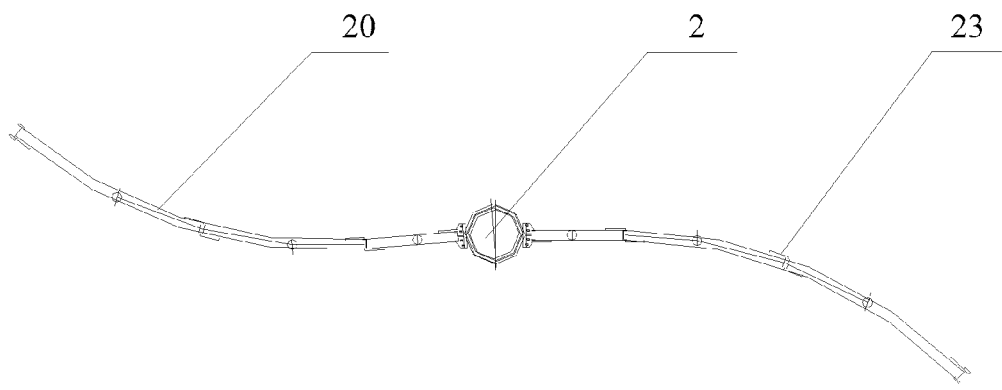
FIG. 7 is a schematic illustrating a top view of FIG. 6.

FIG. 3 is a schematic illustrating a cross-sectional view of FIG. 1 taken through line B-B according to another embodiment of the present invention. The wind blade structure as shown in FIG. 3 may further include a blade opening control mechanism 19. The blade opening control mechanism 19 is provided on the wind blade frame or the wind blade shaft, and can be one or more projecting elements on the wind blade frame or the wind blade shaft, and is used for blocking the movable blade from continuing rotating when the movable blade rotates from the position where the movable blade overlaps with the wind blade frame to a position where the angle between the movable blade and the wind blade frame reaches a pre-set value. The function of the blade opening control mechanism 19 is to block the movable blade when the wind blade frame is moving upwind, so that the portion with a larger area on one side of the movable blade will not rotate to the other side under the force of the wind. If the portion having the larger area rotates to the other side, the portion may have difficulty to return to the original position when the wind blade frame continues to move downwind. Thus, we may need to limit the rotation range of the movable blade within a certain angle which is generally less than or equal to 90 degrees.

The wind blade shaft may be implemented in various manners, e.g., be implemented by a rotary shaft and an axle sleeve. Preferably, in order to reduce the weight of the wind blade structure, the wind blade shaft can only include an upper shaft, a lower shaft and the axle sleeve. As shown in FIG. 1, the upper shaft and the lower shaft are respectively fitted into the axle sleeves 24 on the upper end and the lower end of the movable blade 4.

In order to further increase the area receiving the wind force of the wind blade structure in downwind rotation and reduce the resistance of the wind blade structure in upwind rotation at the same time, the cross-section of the wind blade frame is preferably in an arc shape. As shown in FIG. 2, the cross-section of the movable blade 4 is preferably in a spoon shape.

Since the areas of two portions of the movable blade on the two sides of the wind blade shaft are not equal, the wind blade shaft can also be disposed at a position deviating from the centerline of the wind blade frame. Preferably, the wind blade shaft can be disposed in the wind blade frame at a position which is closer to a rotary shaft of the wind power generating apparatus, and the area of the movable blade is generally less than or equal to the area of the wind blade frame.

According to another embodiment of the present invention, in order to further improve the durability of the wind blade structure, protect the wind blade structure from being easily damaged by strong winds and ensure that the wind wheel rotates in a relative constant speed, at least one wind window can be disposed in the movable blade. The wind window may include a hole in the movable blade and a cover for covering the hole. An upper part of the cover is fixed in the movable blade above the hole. When the wind force is weaker than a preset value, a lower part of the cover hangs down under gravity and covers the hole; when the wind force reaches the preset value, the lower part of the cover is raised under the wind force so that the wind can pass through the hole. The cover can be designed according to the preset strength value of the wind force the wind window is designed to withstand. For example, an area of the cover can be similar to an area of the hole; or a component for increasing the gravity, such as a steel bar or the like, may be disposed on the lower part of the cover; an edge of the cover may have a part sticking out so that the cover keeps covering the hole when the wind force does not reach the preset strength value. Preferably, the cover may be made of textile materials, so that the cover is more easily lifted to expose the hole to discharge the wind, thereby keeping the rated speed of the wind wheel and preventing the wind wheel from being damaged.

In order to further reduce the weight of the wind blade structure to improve the wind energy conversion efficiency, both of the movable blade and the above cover may be made of nylon or polymer textile materials. The wind blade frame may also be made of carbon steel materials which is tough and light in weight. In this way, the maintenance of the wind blade structure may become simpler and more convenient, and the service life of the wind blade structure can be longer.

By using the above wind blade structure, a wind power generating apparatus can be obtained. The wind power generating apparatus may include at least one wind wheel mechanism which rotates around a rotary shaft of the wind power generating apparatus forced by wind. The wind wheel mechanism may include at least one wind blade structure as described above, i.e., the above wind blade frame, wind blade shaft, the movable blade and the blade stopper. Preferably, the wind wheel mechanism may also include the blade opening control mechanism.

The wind power generating apparatus has advantages in that the surface receiving the wind force has a high wind power utilization ratio, while the surface moving against the wind has small resistance.

Further, the "spoon" shaped movable blade may be adopted; the rotary shaft of the movable blade may be installed deviating from the longitudinal center line; the blade stopper and the blade opening control mechanism may be disposed at the contact position between the movable blade and the frame. When the wind wheel mechanism rotates 180 degrees from a downwind position to an upwind position, and the movable blade rotates a certain degrees under the wind force from a position where the movable blade overlaps with the arc-shaped frame, the blade opening control mechanism makes the movable blade stop rotating, which is equivalent to a wind discharge opening is automatically opened, which can greatly reduce the resistance when the wind wheel mechanism rotates from the upwind position to the downwind position. When the frame rotates to a position to receive the wind force, the movable blade automatically returns to the previous position under the action of the wind force, which is equivalent to closing the wind discharge opening, and receives the thrust applied on the blade by the wind force. The above procedures are repeated, and the wind wheel mechanism can work with efficiency.

The size and structure of two wings of the wing wheel mechanism on the two sides of the rotary shaft of the wind power generating apparatus are symmetrical with the rotary shaft as an axis. Each wing may include at least one tier, each tier may include at least one wind blade structure. The wind wheel mechanism may also be composed completely by wind blade structures, i.e., including at least one tier with each tier including at least one wind blade structure, forming a multi-in-one structure.

In the wind wheel mechanism, the width of a wind blade structure near the rotary shaft of the wind power generating apparatus may be smaller than the width of a wind blade structure far from the rotary shaft.

In order to further reduce the resistance of the part of the wind wheel mechanism moving upwind, the cross-section of the wind wheel mechanism may be in an arc shape.

The frame of the wind wheel mechanism may be made of carbon steel materials, and the movable blade may be made of macromolecule textile materials, so that the wind wheel has a small resistance and light in weight, which may greatly reduce the wearing of vulnerable parts of the wind wheel mechanism, ensure operation safety and stability, make the wind wheel mechanism easy to maintain and have a long service life, and the wind wheel mechanism may be installed and used in areas such as river flats, coastal areas and mountain top.

In addition, the aforementioned wind power generating apparatus may also include a power generation controlling apparatus and at least one generator. Each generator corresponds to a preset rotation speed.

The power generation controlling apparatus is for detecting the rotation speed of the rotary shaft, controlling the bottom end of the rotary shaft of the wind power generating apparatus to connect with a generator corresponding to a preset rotation speed through a gear when the rotation speed is detected to be larger than the preset rotation speed, and disconnect the bottom end of the rotary shaft of the wind power generating apparatus with the generator through the gear when the rotation speed is detected to fall smaller than the preset rotation speed.

The power generation controlling apparatus may include: a rotation speed sensor which is connected with the gear, for detecting the rotation speed of the gear; a controller for receiving the rotation speed detected by the rotation speed sensor and controlling the connection or disconnection between the gear and the at least one generator according to the rotation speed detected.

The aforementioned wind power generating apparatus may generally be a vertical axis wind power generating apparatus whose rotary shaft is perpendicular to the ground.

Embodiments of the present invention are hereinafter described in detail with reference to the accompanying drawings.

A vertical axis wind power generating apparatus according to an embodiment of the present invention may include a tower fixed on the ground and beams for fixing the tower. A power rotary shaft is vertically disposed between an upper beam and a lower beam through the center of the upper beam and the lower beam via an upper bearing bracket and a lower bearing bracket. The bottom end of the rotary shaft is connected to a generator clutch through a big gear. At least one generator is connected with a power transformation room via a cable. A multi-in-one non-resistance wind wheel mechanism with 1 to 40 tiers is disposed around the rotary shaft. In each tier, 1 to 5 arc-shaped frames are symmetrically disposed at equal angles with the rotary shaft as an axis. Each arc-shaped frame includes an upper cross bar, a lower cross bar and frame vertical supports. 1 to 5 movable blades are installed within the left wing and right wing of each arc-shaped frame through respective upper shafts, lower shafts and axle sleeves. The blade stopper and the blade opening control mechanism are disposed on the contact position between the movable blade and the arc-shaped frame. Outer end edges of the arc-shaped frames are connected by fixing rods. The generator clutch is connected with the power generation controlling apparatus and controls the big gear to connect with generators with different power capabilities successively and run. The cross-section of the movable blade is a "spoon" shaped structure. The area of an outer portion of the movable blade from the rotary shaft is larger than the area of an inner portion of the movable blade from the rotary shaft. The movable blade within the arc-shaped frame is installed deviating from the longitudinal center line, and the length of the movable blade at one side of the shaft of the movable blade is larger than the length of the movable blade at the other side of the shaft of the movable blade. The rotary shaft has a braking speed restricting apparatus disposed thereon.

Specifically, according to an embodiment of the present invention, a vertical axis wind power generating apparatus is shown in FIGS. 3-6. The vertical axis wind power generating apparatus has a height of 60 m and a diameter of 20 m, and includes 4 reinforced concrete towers 16 fixed on the ground and beams 17 fixing the towers 16. A power rotary shaft 2 with a diameter of 260 cm and a wall thickness of 12 mm is vertically disposed between the upper beam 17 and the lower beam 17 through the center of the upper and lower beams 17 via an upper bearing bracket 1 and a lower bearing bracket 14. The bottom end of the rotary shaft 2 is connected to 3 generator clutches 7 through a big gear 12 which has a diameter of 15 cm, and the total power capability is 3210 KW. The generator 9 is connected with a power transformation room 11 via a cable 10. A braking and speed restricting apparatus 13 is disposed on an upper part of the big gear 12 which is at the lower part of the rotary shaft 2 to ensure that the wind wheel mechanism 15 runs smoothly under a large wind force.

The multi-in-one wind wheel mechanism 15 is disposed around the rotary shaft 2. The wind wheel mechanism 15 may have 5 tiers. In each tier, 3 arc-shaped frames 3 are symmetrically disposed with the rotary shaft 2 as an axis, and the angle between two arc-shaped frames is 120°. Each arc-shaped frame includes an upper cross bar 20, a lower cross bar 22 and frame vertical supports 21. 3 movable blades 4 are installed in each of the left wing and the right wing of each arc-shaped frame 3 through respective upper shafts 5, lower shafts 6 and axle sleeves 24. A blade stopper 23 and a blade opening control mechanism 19 are disposed on the contact position between the movable blades 4 and the arc-shaped frame 3. Outer end edges of the arc-shaped frames 3 are connected by fixing rods 18. The power generation controlling apparatus 8 may include a rotation speed sensor installed on the big gear 12, a computer and controlling software. When the rotation speed of the big gear 12 satisfies the running requirement of the first generator, the computer issues an instruction to connect a generator clutch of a first 1510 KW generator with the big gear 12; when the big gear 12 continues running and the rotation speed of the big gear 12 satisfies the running requirement of a second generator, the computer issues an instruction to connect a generator clutch of the second 1000 KW generator with the big gear 12; finally, a generator clutch of the third 700 KW generator may be connected with the big gear 12.

As shown in FIGS. 1-2, the movable blade 4 may be made of light-weight nylon or polymer textile materials, and may adopt a "spoon" shaped cross-section structure which may maximize the wind power utilization efficiency and reduce the resistance. 3 movable blades are installed on each wing of each arc-shaped frame 3, and the length of the movable blade 4 farthest from the rotary shaft 2 is 429 cm, the length of a middle movable blade 4 is 336 cm, the length of the movable blade 4 which is closest to the rotary shaft 2 is 192 cm, and the heights of the movable blades 4 are all 745 cm. Each movable blade 4 within the arc-shaped frame 3 is installed deviating from the longitudinal center line of the movable blade 4, and the length a of the portion of the movable blade on one side of the axis of the movable blade is larger than the length b of the portion of the movable blade on the other side of the axis of the movable blade.

At present, regarding both horizontal axis wind power generating apparatuses and vertical axis wind power generating apparatuses, due to the influence of various factors such as mechanical reasons, the largest power generation capacity of a single power generating apparatus does not exceed 3000 KW, with power generation capacity of most power generating apparatuses within a range of 500 KW-1000 KW. Due to the relatively small stand-alone power generation capacity, manufacturing cost is relatively high, and the transmission of power and access to the grid are subject to restrictions. Current wind power generating apparatuses are very far from satisfactory with respect to development and usage of wind power resources.

The wind power generating apparatus provided by embodiments of the present invention adopts multi-tier and multi-in-one non-resistance wind wheel mechanism connected with the rotary shaft and the area for receiving wind force is large, thus can generate relatively larger amount of power. Meanwhile, the power generation controlling apparatus is connected with the generator clutch to control the big gear to successively connect to generators with the different power capabilities and to run the generators so that the total power generation capability of such a single wind power generating apparatus can reach up to more than 3000 KW.

In order to facilitate reading the drawings, names of the various components in the drawings are listed below.

In the drawings: 1. upper bearing bracket, 2. rotary shaft, 3. arc-shaped frame, 4. movable blade, 5. upper shaft, 6. lower shaft, 7. generator clutch, 8. power generation controlling apparatus, 9. generator, 10. cable, 11. power transformation room, 12. big gear, 13. breaking and speed restricting apparatus, 14. lower bearing bracket, 15. wind wheel mechanism, 16. tower, 17. beam, 18. fixing rod, 19. blade opening control mechanism, 20. upper cross bar, 21. frame vertical support, 22. lower cross bar, 23. blade stopper, 24. axle sleeve of wind blade.

To sum up, the foregoing are only some embodiments of the present invention, and are not used to limit the scope of the present invention. Any modification, equivalent replacement, or improvement made without departing from the spirit and principle of the present invention should fall within the scope of the present invention.

The invention claimed is:

1. A wind power generating apparatus, comprising: at least one wind wheel mechanism which is capable of rotating around a rotary shaft of the wind power generating apparatus under wind force; wherein the wind wheel mechanism comprises at least one wind blade structure;
the wind blade structure comprises: a wind blade frame, a wind blade shaft, a movable blade and at least one blade stopper;
the wind blade shaft is disposed on the wind blade frame;
the blade stopper is disposed on the wind blade frame or the wind blade shaft and is for blocking the movable blade from rotating when the movable blade rotates around the wing blade shaft to a position where the movable blade overlaps with the wind blade frame;
wherein areas of two portions of the movable blade on both sides of the wind blade shaft are unequal;
wherein the wind blade structure further comprises a blade opening control mechanism;
the blade opening control mechanism is disposed on the wind blade frame or the wind blade shaft and is for blocking the movable blade from continuing rotating when the movable blade rotates from a position where the movable blade overlaps with the wind blade frame to a position where an angle between the movable blade and the wind blade frame equals a preset value.

2. The apparatus according to claim 1, wherein a cross section of the wind wheel mechanism is in an arc shape, a cross section of the wind blade frame is in an arc shape; a cross section of the movable blade is in a spoon shape.

3. The apparatus according to claim 1, wherein the wind blade shaft is disposed in the wind blade frame at a position which is close to the rotary shaft of the wind power generating apparatus, and an area of the movable blade is equal to or less than an area of the wind blade frame.

4. The apparatus according to claim 1, wherein at least one wind window is disposed on the movable blade;
the wind window comprises a hole in the movable blade and a cover for covering the hole;
wherein an upper part of the cover is fixed on the movable blade above the hole; a lower part of the cover hangs down and covers the hole when the wind force is weaker than a preset value, and is lifted to discharge the wind through the hole when the wind force reaches the preset value.

5. The apparatus according to claim 1, wherein two wings of the wing wheel mechanism with the rotary shaft of the wind power generating apparatus as an axis have symmetrical size and structure; each wing comprises at least one tier, and each tier comprises at least one wind blade structure.

6. The apparatus according to claim 5, wherein in the wind wheel mechanism, a width of a first wind blade structure which is closer to the rotary shaft of the wind power generating apparatus is smaller than a width of a second wind blade structure which is farther from the rotary shaft.

7. A wind power generating apparatus, comprising: at least one wind wheel mechanism which is capable of rotating around a rotary shaft of the wind power generating apparatus under wind force; wherein the wind wheel mechanism comprises at least one wind blade structure;
the wind blade structure comprises: a wind blade frame, a wind blade shaft, a movable blade and at least one blade stopper;
the wind blade shaft is disposed on the wind blade frame;
the blade stopper is disposed on the wind blade frame or the wind blade shaft and is for blocking the movable blade from rotating when the movable blade rotates around the wing blade shaft to a position where the movable blade overlaps with the wind blade frame;
wherein areas of two portions of the movable blade on both sides of the wind blade shaft are unequal;
wherein the apparatus further comprising a power generation controlling apparatus and at least one generator; wherein each generator is corresponding to a preset rotation speed;
the power generation controlling apparatus is for detecting a rotation speed of the rotary shaft, controlling a bottom end of the rotary shaft of the wind power generating apparatus to connect with a generator corresponding to a preset rotation speed through a gear when the rotation speed detected is larger than the preset rotation speed; and disconnect the connection between the bottom end of the rotary shaft of the wind power generating apparatus and the generator corresponding to the preset rotation speed through the gear when the rotation speed detected is smaller than the preset rotation speed.

8. The apparatus according to claim 7, wherein the power generation controlling apparatus comprises:
a rotation speed sensor, connected with the gear, for detecting a rotation speed of the gear;
a controller, for receiving the rotation speed detected by the rotation speed sensor and controlling connection or disconnection between the gear and the at least one generator according to the rotation speed.

9. A wind blade structure, comprising: a wind blade frame, a wind blade shaft, a movable blade and at least one blade stopper; wherein
the wind blade shaft is disposed on the wind blade frame;
the blade stopper is at least one projecting element on the wind blade frame or on the wind blade shaft, for stopping the movable blade from rotating when the movable blade rotates around the wing blade shaft to a position where the movable blade overlaps with the wind blade frame;
wherein areas of two portions of the movable blade on both sides of the wind blade shaft are unequal;
wherein the wind blade structure further comprises a blade opening control mechanism;
wherein the blade opening control mechanism is disposed on the wind blade frame or the wind blade shaft and is for stopping the movable blade from continuing rotating when the movable blade rotates from a position where the movable blade overlaps with the wind blade frame to a position where an angle between the movable blade and the wind blade frame equals a preset value.

10. The wind blade structure according to claim 9, wherein the wind blade shaft is disposed in the wind blade frame at a position which is close to a rotary shaft of a wind power generating apparatus, and an area of the movable blade is equal to or less than an area of the wind blade frame.

11. The wind blade structure according to claim 9, wherein a cross section of the wind blade frame is in an arc shape; a cross section of the movable blade is in a spoon shape.

12. The wind blade structure according to claim 9, wherein at least one wind window is disposed on the movable blade;
the wind window comprises a hole in the movable blade and a cover for covering the hole;
wherein an upper part of the cover is fixed on the movable blade above the hole; a lower part of the cover hangs down and covers the hole when a wind force is weaker than a preset value, and is lifted to discharge the wind through the hole when the wind force reaches the preset value.

13. A large scale vertical axis wind power generating apparatus, comprising: a tower (16) fixed on the ground and beams (17) fixing the tower; a power rotary shaft (2) vertically disposed between an upper beam (17) and a lower beam (17) through the center of the upper beam and lower beam (17) via an upper bearing bracket (1) and a lower bearing bracket (14); a bottom end of the rotary shaft (2) is connected to a generator clutch (7) through a big gear (12), the generator (9) is connected with a power transformation room (11) via a cable (10), wherein a multi-in-one non-resistance wind wheel mechanism (15) with 1 to 10 tiers is disposed around the rotary shaft (2); in each of the 1 to 10 tiers, 1 to 5 arc frames (3) are symmetrically disposed at equal angles with the rotary shaft (2) as an axis; each arc frame (3) comprises an upper cross bar (20), a lower cross bar (22) and frame vertical supports (21); 1 to 5 movable blades (4) are installed in each of a left wing and a right wing of each arc frame (3) through respective upper shafts (5), lower shafts (6) and blade sleeves (24); a blade stopper (23) and a blade opening control mechanism (19) are disposed on a contact position between the movable blade (4) and the arc frame (3), outer end edges of the arc frames (3) are connected by fixing rods (18); the generator clutch (7) is connected with a power generation controlling apparatus (8);
wherein the movable blade (4) is installed in the arc frame (3) at a position deviating from a centerline of the wind blade frame; and a length of a portion of the blade on one side of an axis of the blade is larger than a length of a portion of the blade on the other side of the axis of the blade.

14. The apparatus according to claim 13, wherein a cross section of the movable blade (4) is in a spoon shape.

15. The apparatus according to claim 13, wherein an area of a movable blade (4) which is farther from the rotary shaft (2) is larger than an area of a movable blade (4) which is closer to the rotary shaft (2).

16. The apparatus according to claim 13, wherein a breaking and speed restricting apparatus (13) is disposed on the rotary shaft (2).

17. The apparatus according to claim 13, wherein the big gear (12) is connected with 1 to 5 generator clutches (7).

* * * * *